United States Patent

Brandt et al.

[11] 4,374,642
[45] Feb. 22, 1983

[54] DYESTUFF MIXTURES, A PROCESS FOR THEIR PREPARATION AND A PROCESS FOR DYEING HYDROPHOBIC FIBRES

[75] Inventors: Horst Brandt, Odenthal; Reinhold Hörnle, Cologne; Richard Büchele; Dieter Wiegner, both of Odenthal, all of Fed. Rep. of Germany

[73] Assignee: Bayer Aktiengesellschaft, Leverkusen, Fed. Rep. of Germany

[21] Appl. No.: 268,965

[22] Filed: Jun. 1, 1981

[30] Foreign Application Priority Data

Jun. 21, 1980 [DE] Fed. Rep. of Germany ....... 3023330

[51] Int. Cl.³ .............................................. C09B 67/22
[52] U.S. Cl. .......................................... 8/639; 8/643; 260/208
[58] Field of Search ...................... 8/639, 643; 260/208

[56] References Cited

U.S. PATENT DOCUMENTS

| | | | |
|---|---|---|---|
| 2,628,963 | 2/1953 | Laucius et al. | 260/376 |
| 3,962,209 | 6/1976 | Gotteschlich et al. | 260/152 |
| 4,105,655 | 8/1978 | Gottschlich et al. | 260/208 |

FOREIGN PATENT DOCUMENTS

| | | |
|---|---|---|
| 2928432 | 1/1980 | Fed. Rep. of Germany . |
| 53-61781 | 6/1978 | Japan . |

Primary Examiner—A. Lionel Clingman
Attorney, Agent, or Firm—Sprung, Horn, Kramer & Woods

[57] ABSTRACT

Mixed crystals of dyestuffs of the formula I

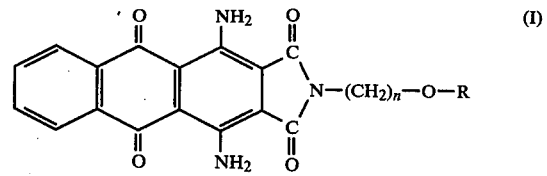

wherein
R denotes alkyl and
n denotes a number from 2 to 4, and dyestuffs of the formula II

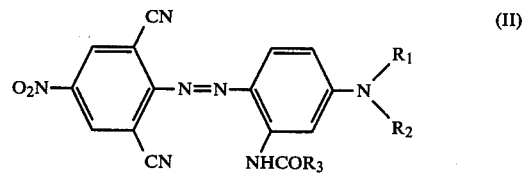

wherein
$R_1$, $R_2$ and $R_3$ denote alkyl, with a characteristic X-ray diffraction diagram are distinguished by a high tinctorial strength and liquor stability when they are used for dyeing polyester fibres.

6 Claims, 3 Drawing Figures (mixed crystal)

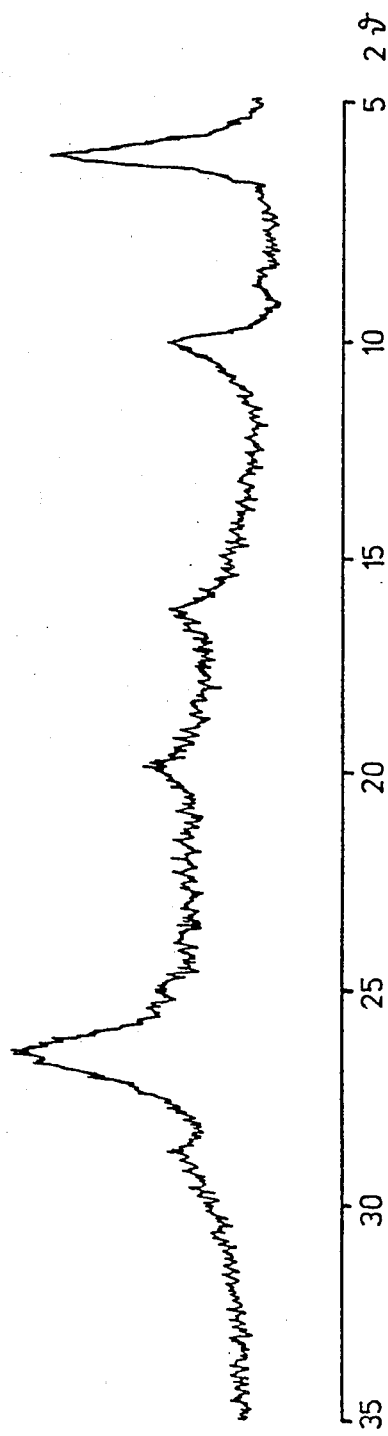
FIG. 1 (mixed crystal)

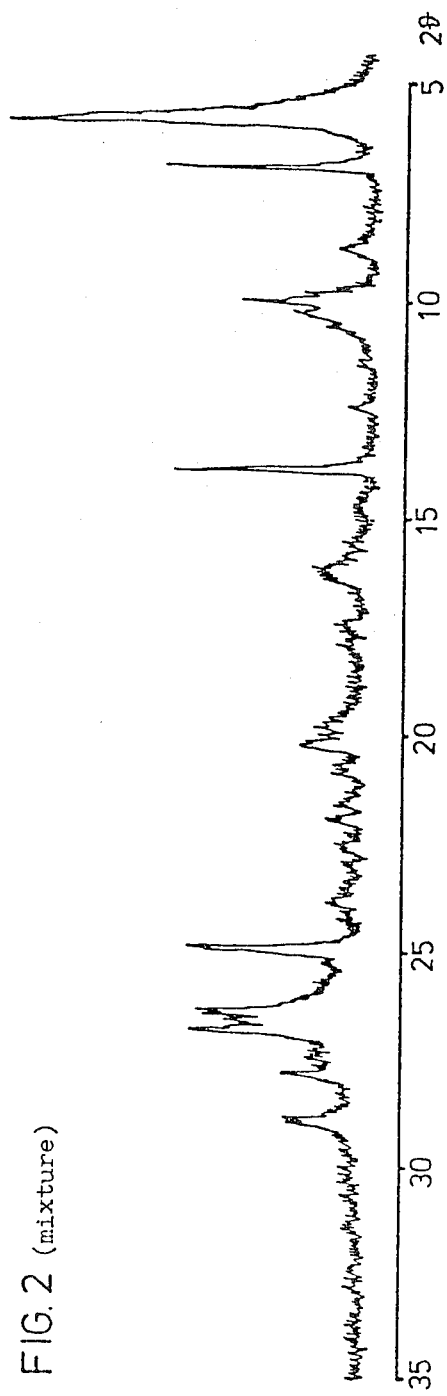
FIG. 2 (mixture)
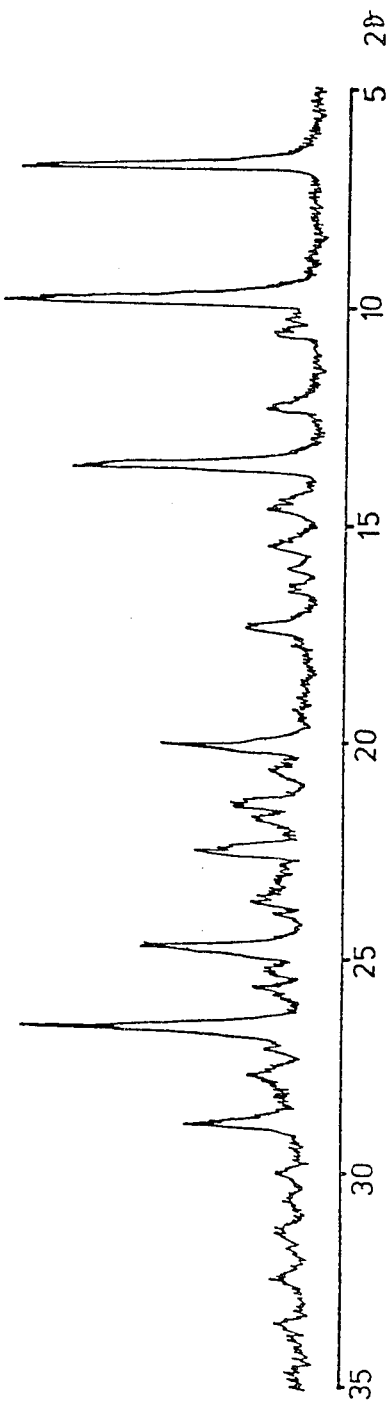
FIG. 3 (dyestuff II)

DYESTUFF MIXTURES, A PROCESS FOR THEIR PREPARATION AND A PROCESS FOR DYEING HYDROPHOBIC FIBRES

The invention relates to dyestuff mixtures consisting of 75–99, preferably 85–97, percent by weight of one or more dyestuffs of the formula

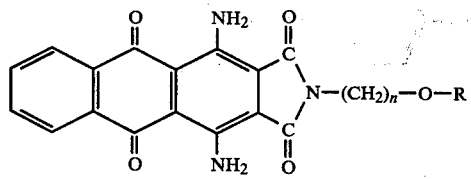

wherein
R denotes $C_1-C_4$-alkyl and
n denotes 2, 3 or 4,
and 1–25, preferably 3–15, percent by weight of one or more dyestuffs of the formula

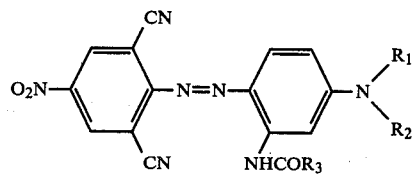

wherein
$R_1$ and $R_2$ denote $C_1-C_5$-alkyl and
$R_3$ denotes $C_1-C_2$-alkyl.

These mixtures are characterised in that they exist in the form of mixed crystals, which are characterised by their X-ray diffraction diagram with reflection intensities of 100, 26, 14 and 54 at the angles of incidence $\theta$ of 5.75°, 10.0°, 16.2° and 26.4°.

The individual dyestuffs of the formulae I and II are known (compare U.S. Pat. No. 2,628,963, German Patent Specifications Nos. 939,044, 945,112 and 1,544,563 and U.S. Pat. No. 3,962,209).

Simple mixtures of these dyestuffs are also described in the literature (compare German Offenlegungsschrift No. 2,928,432 and Japanese Preliminary Published Application No. 53/061,781).

In contrast to these mixtures (compare FIG. 2) the reflections of the dyestuffs II in the mixed crystals according to the invention have disappeared completely (compare FIG. 1).

These mixed crystals are obtained when mixtures of the dyestuffs in 2 to 3 times the amount of water are subjected to heat treatment at 90°–110° C., if appropriate in the presence of 0.5 to 1 times the amount of a customary dispersing agent.

It is expedient to carry out this heat treatment in continuously operating heating units, such as a spiral tube evaporator or a heated stirred mill.

Suitable dispersing agents which are added to the dyestuff mixtures in order to prepare an aqueous suspension which is capable of flowing are dinaphthylmethanesulphonic acids, condensation products of m-cresol, formaldehyde and sodium bisulphite, and ligninsulphonates.

The mixed crystals according to the invention are outstandingly suitable for dyeing hydrophobic fibres, in particular polyester fibres, and are distinguished by a high tinctorial strength and liquor stability. Moreover, the undesired effect of "catalytic fading", such as is frequently observed with dyestuffs of the formula II, does not occur at all or occurs only to a very slight extent.

EXAMPLE 1

92 g of a 66% strength aqueous press cake of the dyestuff of the formula A are combined with 33.7 g of a 95% strength aqueous press cake of the dyestuff of the formula B, 5 g of a dispersing agent based on ligninsulphonic acids and 36.5 g of water to form a paste, which, after preliminary comminution in a corundum disc mill, is mixed with a further 38 g of dispersing agent and 39 g of water to form a ground paste with a solids content of 48%.

The paste is ground in a bead mill with glass beads for 10 minutes at room temperature and then for 30 minutes at a product temperature at the outlet of 85° C., and then twice more at room temperature. A dyestuff powder which has the X-ray spectrum shown in FIG. 1 is obtained from this ground paste by spray-drying. When used for dyeing polyester fibres by the high-temperature method, the dyestuff mixture is distinguished by an excellent liquor stability. Dyestuff of the formula A

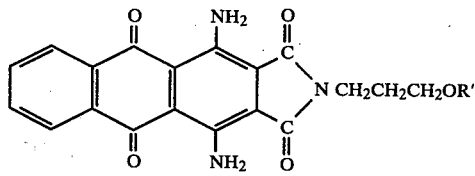

wherein
$R' = CH_3$, $C_2H_5$ and $CH(CH_3)_2$ in the ratio 1:1:1 Dyestuff of the formula B

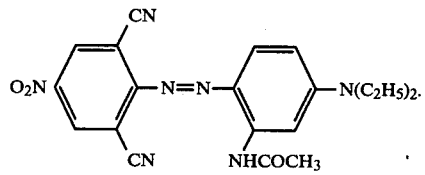

Similar effects are achieved when mixtures of the dyestuffs in the ratio given are used.

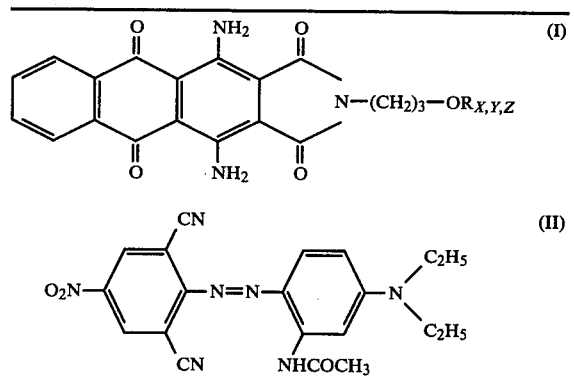

| No. | Dyestuff I with $R_{X,Y,Z}$ | Dyestuff I/ X/Y/Z | Dyestuff I/ dyestuff II | Tinctorial strength in %, compared with dyestuff I of No. 1 |
|---|---|---|---|---|
| 1 | $CH_3$, $C_2H_5$, | 1/1/1 | 9.5/0.5 | 131 |

-continued

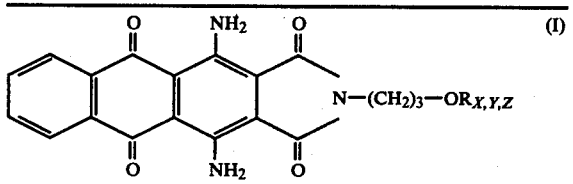

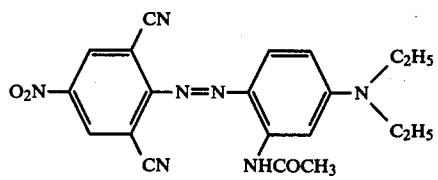

| No. | Dyestuff I with $R_{X,Y,Z}$ | X/Y/Z | Dyestuff I/ dyestuff II | Tinctorial strength in %, compared with dyestuff I of No. 1 |
|---|---|---|---|---|
| 2 | CH$_3$, C$_2$H$_5$, CH$_3$CHCH$_3$ | 1/1/1 | 9.33/0.67 | 142 |
| 3 | CH$_3$, C$_2$H$_5$, CH$_3$CHCH$_3$ | 1/1/1 | 9/1 | 173 |
| 4 | CH$_3$, C$_2$H$_5$, CH$_3$CHCH$_3$ | 1/1/1 | 8.5/1.5 | 196 |
| 5 | CH$_3$ | 1/0/0 | 9/1 | 114 |
| 6 | C$_2$H$_5$ | 1/0/0 | 9/1 | 131 |
| 7 | CH$_3$, C$_2$H$_5$ | 1/1/0 | 9/1 | 131 |

We claim:

1. Dyestuff mixed crystals consisting of 75-99 percent by weight of (a) at least one dyestuff of the formula

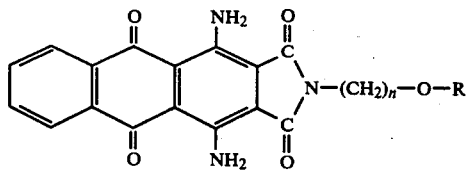

wherein
R is C$_1$-C$_4$-alkyl and
n is 2, 3 or 4,
and 1-25 percent by weight of (b) at least one dyestuff of the formula

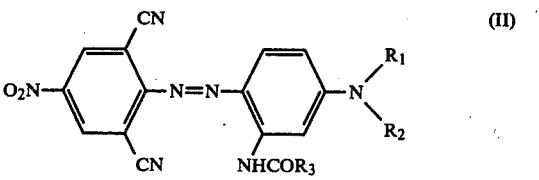

wherein
R$_1$ and R$_2$ each is C$_1$-C$_5$-alkyl and
R$_3$ is C$_1$-C$_2$-alkyl,
the X-ray diffraction diagram of the crystals having reflection intensities of 100, 26, 14 and 54 at the angles of incidence $\theta$ of 5.75°, 10.0°, 16.2° and 26.4°.

2. Dyestuff mixed crystals according to claim 1, wherein
R is methyl, ethyl or isopropyl,
n is 3,
R$_1$ and R$_3$ are ethyl and
R$_3$ is methyl.

3. Dyestuff mixed crystals according to claim 1, wherein
R is methyl, ethyl and isopropyl, in the ratio 1:1:1.

4. Dyestuff mixed crystals according to claim 1, wherein (a) is present in about 85 to 97 percent by weight and (b) is present in about 15 to 3 percent by weight.

5. A process for the preparation of mixed crystals according to claim 1 comprising subjecting a mixture of (a) and (b) in the specified proportions to heat treatment in an aqueous medium at 90° to 110° C.

6. In the dyeing of hydrophobic fiber materials, the improvement which comprises effecting the dyeing with dyestuff mixed crystals according to claim 1.

* * * * *

UNITED STATES PATENT AND TRADEMARK OFFICE
CERTIFICATE OF CORRECTION

PATENT NO. : 4,374,642

DATED : February 22, 1983

INVENTOR(S) : Horst Brandt et al

It is certified that error appears in the above—identified patent and that said Letters Patent is hereby corrected as shown below:

Col. 4, line 25             Delete "$R_3$" and insert --$R_2$--

Signed and Sealed this

Seventeenth Day of May 1983

[SEAL]

Attest:

DONALD J. QUIGG

Attesting Officer      Acting Commissioner of Patents and Trademarks